(12) United States Patent
Baldwin

(10) Patent No.: US 8,887,398 B1
(45) Date of Patent: Nov. 18, 2014

(54) EXTRUDED MEMBER WITH ALTERED RADIAL FINS

(71) Applicant: Tesla Motors, Inc., Palo Alto, CA (US)

(72) Inventor: Michael J. Baldwin, Warwickshire (GB)

(73) Assignee: Tesla Motors, Inc., Palo Alto, CA (US)

(*) Notice: Subject to any disclaimer, the term of this patent is extended or adjusted under 35 U.S.C. 154(b) by 9 days.

(21) Appl. No.: 13/872,866

(22) Filed: Apr. 29, 2013

(51) Int. Cl.
B21C 23/10 (2006.01)
B60R 19/34 (2006.01)
B60R 19/18 (2006.01)

(52) U.S. Cl.
CPC ........... B60R 19/34 (2013.01); B60R 2019/182 (2013.01)
USPC ........................ 29/897.2; 72/367.1; 72/370.16

(58) Field of Classification Search
CPC .... B21C 37/202; B21C 37/207; B21C 23/10; B60R 19/34; B60R 2019/182; F28F 1/40; H01R 43/08
USPC ............. 29/597, 890.046, 0.048, 0.049, 0.05, 29/0.053, 897.2; 72/253.1, 367.1, 368, 72/369, 370.16, 370.17, 370.18; 180/311
See application file for complete search history.

(56) References Cited

U.S. PATENT DOCUMENTS 3,765,207 A * 10/1973 Winter et al. ...................... 72/78
4,216,575 A * 8/1980 Carnavos et al. ............... 29/597
4,476,704 A * 10/1984 Hage et al. ...................... 72/276
5,058,266 A * 10/1991 Knoll ....................... 29/890.049
5,586,598 A * 12/1996 Tanaka et al. .................. 165/133
5,704,424 A * 1/1998 Kohno et al. .................. 165/184
8,573,022 B2 * 11/2013 Thors et al. ................ 72/370.16
2004/0231390 A1 11/2004 Fujioka
2007/0241571 A1 10/2007 Nunes
2009/0211184 A1 8/2009 Kerscher
2009/0294112 A1 * 12/2009 Reifel et al. ................... 165/179
2010/0181804 A1 7/2010 Malvino
2010/0252168 A1 10/2010 Pawson
2011/0212356 A1 9/2011 Tennessen et al.
2012/0151843 A1 6/2012 Rawlinson
2012/0153675 A1 6/2012 Rawlinson
2012/0153682 A1 6/2012 Rawlinson
2012/0161472 A1 6/2012 Rawlinson et al.
2012/0169023 A1 7/2012 Rawlinson
2012/0175897 A1 7/2012 Rawlinson
2012/0175900 A1 7/2012 Rawlinson
2013/0088045 A1 4/2013 Charbonneau

* cited by examiner

Primary Examiner — Alexander P Taousakis
(74) Attorney, Agent, or Firm — J. Richard Soderberg

(57) ABSTRACT

A method of extruding a component includes: creating a first design of a component, wherein in the first design the component comprises a member and is configured for an implementation; adding at least one radial fin to the member in the first design, the member and the radial fins being a second design of the component; extruding a piece that conforms to the second design and has at least one extruded radial fin; and altering the extruded radial fin on the extruded piece, the alteration adding or enhancing a structural property of the component in the implementation.

9 Claims, 2 Drawing Sheets

EXTRUDED MEMBER WITH ALTERED RADIAL FINS

BACKGROUND

Extrusion of aluminum is done to manufacture various types of components for different purposes. For example, toward the front end of vehicles there is usually provided some shock-absorbing structure. Such structures can include a beam that is intended to collapse (or otherwise deform) upon impact. Extruding the piece can provide desired structural properties, such as strength and low weight. However, if the part has a prismatic shape this can limit the ability of the design to provide a controlled collapse. Similarly, if the part is welded during assembly, the heat-effected zones caused by the welding can also disrupt mechanical properties in unwanted ways.

SUMMARY

In a first aspect, a method of extruding a component includes: creating a first design of a component, wherein in the first design the component comprises a member and is configured for an implementation; adding at least one radial fin to the member in the first design, the member and the radial fins being a second design of the component; extruding a piece that conforms to the second design and has at least one extruded radial fin; and altering the extruded radial fin on the extruded piece, the alteration adding or enhancing a structural property of the component in the implementation.

Implementations can include one or more of the following features. The structural property includes initiation of collapse, and altering the extruded radial fin includes creating at least one notch in the extruded radial fin. The structural property includes stability, and altering the extruded radial fin includes removing material along a portion of the extruded radial fin. Altering the extruded radial fin further includes creating a notch in a portion of the extruded radial fin exposed by removal of the material. The radial fin in the second design extends essentially from one end to another of the component. The implementation is a vehicle and the component includes a front longitudinal of the vehicle. Multiple radial fins are added to the member in the first design, the multiple radial fins being equally distributed circumferentially around the member. Altering the extruded radial fin includes machining at least part of the extruded radial fin. Altering the extruded radial fin includes cropping at least part of the extruded radial fin.

In a second aspect, a longitudinal member for a vehicle implementation includes: an extruded piece wherein at least one extruded radial fin has been altered by cropping or machining after extrusion, the alteration adding or enhancing a structural property of the component in the vehicle implementation.

Implementations can include one or more of the following features. The structural property includes initiation of collapse, and the extruded radial fin is altered to create at least one notch in the extruded radial fin. The structural property includes stability, and the extruded radial fin is altered to remove material along a portion of the extruded radial fin. The radial fin extends essentially from one end to another end of the longitudinal member. The longitudinal member includes a front longitudinal of a vehicle. Multiple radial fins are equally distributed circumferentially around the longitudinal member.

DETAILED DESCRIPTION

This document describes techniques that can impart desired structural properties to an extruded component. In some implementations, a component design for an extruded piece is modified to add one or more radial fins, and in the extruded piece, some part(s) of the extruded radial fin is altered to add or enhance a desired physical property. For example, the fin can be cropped and/or machined to generate one or more notches or other profiles in the fin.

Figure 1A:
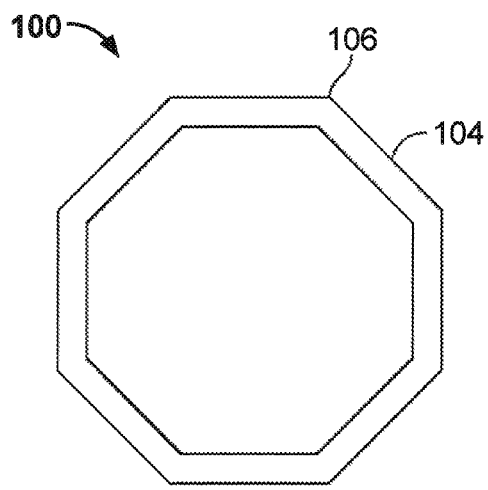
FIGS. 1A-C show a first design and a second design of a component.
Figure 1B:
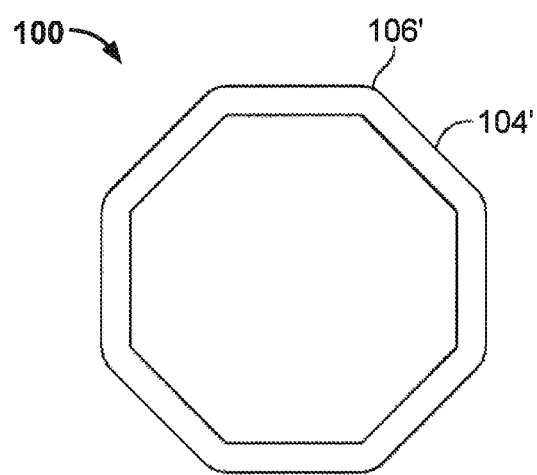
Figure 1C:
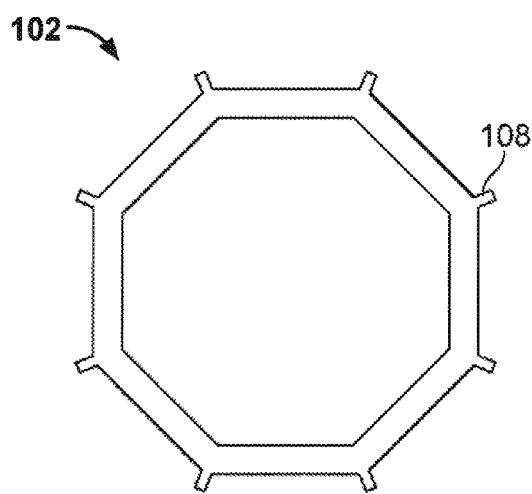

FIGS. 1A-C show a first design 100 and a second design 102 of a component. Particularly, the first design represents an initial design that has been created with a particular implementation in mind. For example, the first design can be created using any suitable drawing tool, including, but not limited to, a computer-aided design (CAD) program.

Here, the first design is a cross-section of a longitudinal component that is essentially octagonal. Particularly, the first design comprises sides 104 that are intended to form the outer surface of the final extruded piece. In the first design, each of the sides 104 meets two other sides at corners 106.

However, the shape of the first design 200 may not provide sufficient structural properties for the intended use of the extruded component. With some implementations, it may be desired that the extruded component will collapse in a certain way upon being impacted. For example, it may be the case that the corners 106 introduce unwanted weakness into the design, and/or that it is difficult to obtain a controlled collapse of the component when it is shaped according to the first design.

The design can therefore be modified in one or more ways, such as using the CAD program. For example, in FIG. 1B, the first design 100 has been provided with flattened corners 106'. This creates sides 104' that are somewhat different than the sides 104.

Moreover, one or more radial features can be added to the component. In some implementations, a radial fin 108 is provided at each of the corners 106'. In this example, the radial fins 108 complete the second design 102 so that it is ready for use in extrusion. For example, the radial fins are here designed to have a linear profile when the piece is extruded.

Figure 2A:
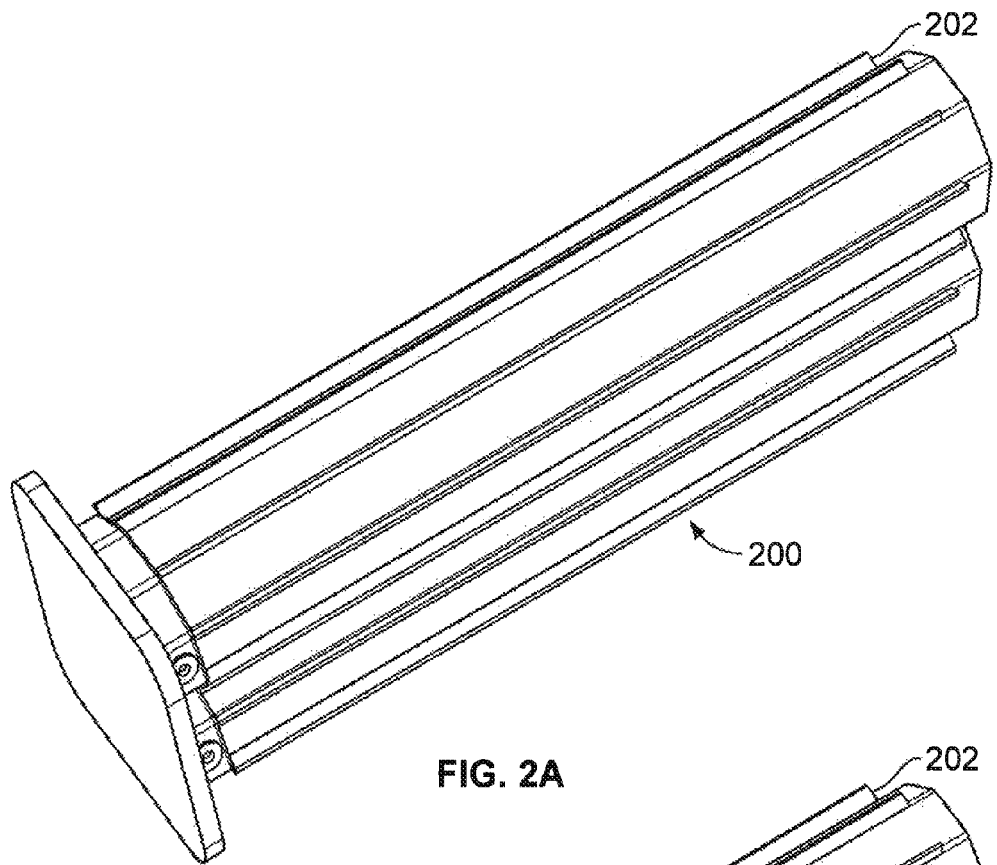
FIGS. 2A-B show a front longitudinal having extruded radial fins.
Figure 2B:
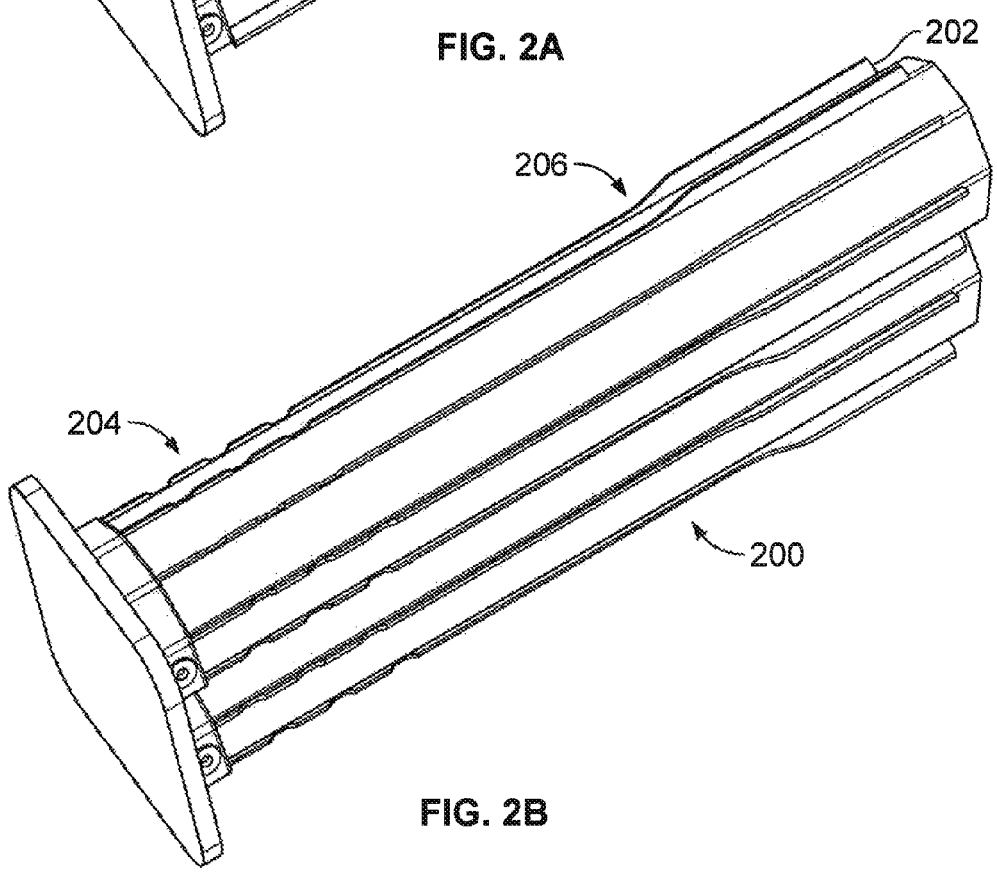

FIGS. 2A-B show a front longitudinal 200 having extruded radial fins 202. The front longitudinal may have been extruded based on a particular extrusion design, similar to the one described above. For example, the extruded radial fins 202 may result from adding radial fins to an existing design. The front longitudinal can be extruded using any suitable extrusion technique and material, including, but not limited to, aluminum.

Currently, the extruded radial fins 202 have a consistent height over the length of the front longitudinal 200. That is, each extruded radial fin extends radially from the front longitudinal and its radial height is essentially constant over the entire piece. Moreover, all the extruded radial fins here have the same height.

One or more modifications of an extruded radial fin can be done. In some implementations, material can be removed from the extruded radial fin(s) using one or more techniques. For example, FIG. 2B shows notches 204 and a thinning 206 that have been provided on the extruded radial fins 202. In some implementations, the fin material that was not removed by the thinning 206 (i.e., toward the end of the front longitudinal) can serve as added structure at the end of the piece, which can prevent or reduce bending of the front longitudinal upon impact. For example, when the longitudinal serves as an energy-absorbing component, it may be desirable to provide extra strength at certain places without adding unnecessary weight all over the piece.

In some implementations, the notches 204 can serve to create local weakness where it is desired that the front longitudinal 200 should start collapsing upon impact. That is, it may be contemplated that the extruded piece should at least partially collapse—to absorb energy—if the crash is severe enough, and such weakness(es) can provide a more controlled progression of the collapse.

Here, the same modification was provided on all of the extruded radial fins. In another implementation, different modifications can be performed on at least one of the fins compared to the other fin(s). One or more of the extruded radial fins 202 can remain unmodified.

The modification can be performed using any technique suitable for removing extruded material. For example, and without limitation, material can be cropped off from an extruded fin. As another example, the fin(s) can be machined to the desired shape.

A number of examples have been described herein. Nevertheless, other implementations are within the scope of the following claims.

What is claimed is:

1. A method of extruding a component, the method comprising:
   creating a first design of a component, the component being a shock absorbing structure that is intended to at least partially collapse upon impact, wherein in the first design the component comprises a member and is configured for an implementation;
   adding at least one radial fin to the member in the first design, the member and the radial fins being a second design of the component;
   extruding a piece that conforms to the second design and has at least one extruded radial fin; and
   altering the extruded radial fin on the extruded piece, the alteration adding or enhancing a structural property of the component in the implementation.

2. The method of claim 1, wherein the structural property includes initiation of collapse, and wherein altering the extruded radial fin comprises creating at least one notch in the extruded radial fin.

3. The method of claim 1, wherein the structural property includes stability, and wherein altering the extruded radial fin comprises removing material along a portion of the extruded radial fin.

4. The method of claim 3, wherein altering the extruded radial fin further comprises creating a notch in a portion of the extruded radial fin exposed by removal of the material.

5. The method of claim 1, wherein the radial fin in the second design extends essentially from one end to another of the component.

6. The method of claim 1, wherein the implementation is a vehicle and the component comprises a front longitudinal of the vehicle.

7. The method of claim 1, wherein multiple radial fins are added to the member in the first design, the multiple radial fins being equally distributed circumferentially around the member.

8. The method of claim 1, wherein altering the extruded radial fin comprises machining at least part of the extruded radial fin.

9. The method of claim 1, wherein altering the extruded radial fin comprises cropping at least part of the extruded radial fin.

\* \* \* \* \*